United States Patent
Asaad et al.

(10) Patent No.: US 9,690,813 B2
(45) Date of Patent: *Jun. 27, 2017

(54) TUNABLE HARDWARE SORT ENGINE FOR PERFORMING COMPOSITE SORTING ALGORITHMS

(71) Applicant: International Business Machines Corporation, Armonk, NY (US)

(72) Inventors: Sameh W. Asaad, Briarcliff Manor, NY (US); Hong Min, Poughkeepsie, NY (US); Bharat Sukhwani, Briarcliff Manor, NY (US); Mathew S. Thoennes, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/977,835

(22) Filed: Dec. 22, 2015

(65) Prior Publication Data

US 2016/0110395 A1   Apr. 21, 2016

Related U.S. Application Data

(63) Continuation of application No. 13/961,094, filed on Aug. 7, 2013, now Pat. No. 9,251,218.

(51) Int. Cl.
*G06F 17/30* (2006.01)
*G06F 7/22* (2006.01)

(52) U.S. Cl.
CPC .......... *G06F 17/30312* (2013.01); *G06F 7/22* (2013.01); *G06F 17/3053* (2013.01);
(Continued)

(58) Field of Classification Search
USPC ........ 711/100, 105, 109, 118, 170; 707/737, 707/752
See application file for complete search history.

(56) References Cited

U.S. PATENT DOCUMENTS

| 738,247 A | 9/1903 | Schoof |
| 5,210,870 A | 5/1993 | Baum et al. |

(Continued)

FOREIGN PATENT DOCUMENTS

| EP | 2182448 A1 | 5/2010 |
| WO | 9954833 A2 | 10/1999 |

(Continued)

OTHER PUBLICATIONS

U.S. Appl. No. 14/977,832, filed Dec. 22, 2015; "Tunable Hardware Sort Engine for Performing Composite Sorting Algorithms".

(Continued)

*Primary Examiner* — Hung T Vy
(74) *Attorney, Agent, or Firm* — Cantor Colburn LLP; Mercedes Hobson

(57) ABSTRACT

Embodiments include methods, systems and computer program products for performing a composite sort on a tunable hardware sort engine includes determining desired sort performance parameters, configuring a composite sort engine based on the desired sort performance parameters, and receiving a plurality of keys having a payload associated with each of the plurality of keys. The method also includes reserving DRAM storage for each of the payloads, generating a tag for each of the plurality of keys, the tag identifying the DRAM storage reserved for each of the payloads, and storing the payloads in the portions of the DRAM storage. The method further includes generating a composite key for each of the plurality of keys, sorting the composite keys by the composite sort engine, and retrieving the payloads associated with the sorted composite keys from (Continued)

the DRAM storage. The method also includes outputting the payloads associated the sorted composite keys.

13 Claims, 5 Drawing Sheets

(52) U.S. Cl.
CPC .. *G06F 17/30336* (2013.01); *G06F 17/30377* (2013.01); *G06F 17/30495* (2013.01); *G06F 17/30595* (2013.01)

(56) References Cited

U.S. PATENT DOCUMENTS

| | | | |
|---|---|---|---|
| 5,274,805 | A | 12/1993 | Ferguson et al. |
| 5,287,494 | A | 2/1994 | Garcia et al. |
| 5,355,478 | A | 10/1994 | Brady et al. |
| 5,579,514 | A | 11/1996 | Turek et al. |
| 5,619,693 | A | 4/1997 | Troisi |
| 5,619,713 | A | 4/1997 | Baum et al. |
| 6,282,541 | B1 | 8/2001 | Hoa et al. |
| 6,330,559 | B1 | 12/2001 | Azuma |
| 6,385,612 | B1 | 5/2002 | Troisi |
| 6,748,386 | B1 | 6/2004 | Li |
| 6,891,834 | B1 | 5/2005 | Dally et al. |
| 7,158,996 | B2 | 1/2007 | Croisettier et al. |
| 8,135,747 | B2 | 3/2012 | Anzalone et al. |
| 8,185,867 | B2 | 5/2012 | Robinson |
| 8,244,718 | B2 | 8/2012 | Chamdani et al. |
| 8,261,020 | B2 | 9/2012 | Krishnaprasad et al. |
| 8,321,476 | B2 | 11/2012 | Kirk et al. |
| 8,392,463 | B2 | 3/2013 | Gautam et al. |
| 8,645,623 | B1* | 2/2014 | O'Shea .............. G06F 12/0866 711/100 |
| 8,688,683 | B2 | 4/2014 | Simon et al. |
| 9,251,219 | B2 | 2/2016 | Asaad et al. |
| 2002/0078023 | A1 | 6/2002 | Lawton |
| 2003/0018630 | A1 | 1/2003 | Indeck et al. |
| 2003/0212668 | A1 | 11/2003 | Hinshaw et al. |
| 2006/0224563 | A1 | 10/2006 | Hanson et al. |
| 2007/0005925 | A1* | 1/2007 | Burkley .............. G06F 12/023 711/170 |
| 2007/0169059 | A1 | 7/2007 | Halambi et al. |
| 2007/0277036 | A1 | 11/2007 | Chamberlain et al. |
| 2008/0183688 | A1 | 7/2008 | Chamdani et al. |
| 2008/0189252 | A1 | 8/2008 | Branscome et al. |
| 2008/0250011 | A1 | 10/2008 | Haubold et al. |
| 2009/0106194 | A1 | 4/2009 | Furusho |
| 2009/0132638 | A1 | 5/2009 | Kim et al. |
| 2009/0313436 | A1 | 12/2009 | Krishnaprasad et al. |
| 2010/0005077 | A1 | 1/2010 | Krishnamurthy et al. |
| 2010/0042624 | A1 | 2/2010 | Min et al. |
| 2010/0185954 | A1 | 7/2010 | Simernitski et al. |
| 2010/0293338 | A1 | 11/2010 | Krishnaprasad et al. |
| 2011/0167056 | A1 | 7/2011 | Khanolkar et al. |
| 2012/0017126 | A1 | 1/2012 | Yamano |
| 2012/0047126 | A1 | 2/2012 | Branscome et al. |
| 2012/0124055 | A1 | 5/2012 | Deubel et al. |
| 2012/0124070 | A1 | 5/2012 | Mishra et al. |
| 2012/0136875 | A1 | 5/2012 | Pan et al. |
| 2012/0246156 | A1 | 9/2012 | Gupta et al. |
| 2012/0246170 | A1 | 9/2012 | Iantorno |
| 2012/0278339 | A1 | 11/2012 | Wang |
| 2012/0310882 | A1 | 12/2012 | Werner et al. |
| 2013/0054942 | A1 | 2/2013 | Serrano |
| 2013/0282687 | A1 | 10/2013 | Ah-Pine et al. |
| 2014/0351239 | A1 | 11/2014 | Davis et al. |
| 2015/0046427 | A1 | 2/2015 | Asaad et al. |
| 2015/0046428 | A1 | 2/2015 | Asaad et al. |
| 2015/0046430 | A1 | 2/2015 | Asaad et al. |
| 2015/0046453 | A1 | 2/2015 | Asaad et al. |
| 2015/0046475 | A1 | 2/2015 | Asaad et al. |
| 2015/0046478 | A1 | 2/2015 | Asaad et al. |
| 2015/0046486 | A1 | 2/2015 | Asaad et al. |
| 2016/0012107 | A1 | 1/2016 | Asaad et al. |
| 2016/0110390 | A1 | 4/2016 | Asaad et al. |

FOREIGN PATENT DOCUMENTS

| | | |
|---|---|---|
| WO | 2007061430 A1 | 5/2007 |
| WO | 2007143198 A2 | 12/2007 |
| WO | 2012024585 A1 | 2/2012 |
| WO | 2013055812 A1 | 4/2013 |

OTHER PUBLICATIONS

U.S. Appl. No. 12/246,751, filed Oct. 7, 2008; "Dynamically Adjustable Tournament Tree".
U.S. Appl. No. 14/583,999, filed Dec. 29, 2014; "Hardware Implementation of a Tournament Tree Sort Algorithm Using an External Memory".
U.S. Appl. No. 14/741,490, filed Jun. 17, 2015; "Hardware Implementation of a Tournament Tree Sort Algorithm Using an External Memory".
Cheng et al., "An Efficient Hybrid Join Algorithm: A DB2 Prototype", Data Base Technology Institute, IBM Santa Teresa Laboratory, San Jose, CA 95161, USA, 1991 IEEE, pp. 171-180.
CSE 326 Data Structure "Pointers", dated Jan. 19, 2005; pp. 1-6.
Geambasu et al., "Vanish: Increasing Data Privacy with Self-Destructing Data", 18th USENIX Security Symposium; 52 pgs.
Gosink et al., "Query-Driven Visualization of Time-Varying Adaptive Mesh Refinement Data", IEEE Transactions on Visualization and Computer Graphics, vol. 14, No. 6, Nov./Dec. 2008; pp. 1715-1722.
Hey et al., "Cyberinfrastructure for e-Science", Science 308, 817 (2005); cover page and pp. 817-821.
Iyer, Balakrishna R. "Hardware Assisted Sorting in IBM's DB2 DBMS", International Conference on Management of Data, COMAD 2005b, Dec. 20-22, 2005, Computer Society of India, 2005; 9 pgs.
Jenson, Jonas Julian "Reconfigurable FPGA Accelerator for Databases," Master Thesis, University of Oslo Department of Informatics; Aug. 1, 2012; 107 pgs.
Kumar et al., "Improved Algorithms and Data Structures for Solving Graph Problems in External Memory", Department of EECS, Northwestern university, Evanston, IL 60208, 1996 IEEE, pp. 169-176.
Ledjfors, Calle "High-Level GPU Programming Domain-specific optimization and inference", Doctoral dissertation, 2008, Department of Computer Science Lund University; 120 pgs.
Levitt et al., "An Image Understanding Environment for DARPA Supported Research and Applications, First Annual Report" Advanced Decision Systems Mountain View, CA 1991, 80 pgs.
Pawlowski, et al., "Parallel Sorting of Large Data Volumes on Distributed Memory Multiprocessors", Parallel Computer Architectures, Springer Berlin Heidelberg, 1993, 246-264, 19 pgs.
Rahkila, P., "Grain—A Java Data Analysis System for Total Data Readout", Nuclear Instruments and Methods in Physics Research Section A: Accelerators, Spectrometers, Detectors and Associated Equipment 595.3 (2008): 637-642; 13 pgs.
Singh et al., "Introduction to the IBM Netezza Warehouse Appliance," Proceedings CASCON '11 Proceedings fo the 2001 conference of the Center for Advanced Studies on Collaborative Research; pp. 385-386.
Stack, Michael "The Theory Behind the z/Architecture Sort Assist Instructions", SHARE in San Jose, Sesssion 8121; Aug. 10, 2008, pp. 1-100.
Stonebraker, Michael R., "Architectural Options for Object-Relational DBMSs", White Paper (1997), 16 pgs.
Sukhwani et al., "A Hardware/Software Approach for Database Query Acceleration with FPGAs", Int. J. Parallel Prog., Published online: Oct. 28, 2014; Springer; pp. 1-31.
Sukhwani, et al., "Database Analytics Acceleration using FPGAs," PACT '12 Proceedings of the 21st International Conference on Parallel Architectures and Compilation Techniques; pp. 411-420.
Vaidya et al., "A Novel Multicontext Coarse-Grained Join Accelerator for Column-Oriented Databases," International Conference on Engineering of Reconfigurable Systems and Algorithms (ERSA), 2009; 7 pgs.

(56) References Cited

OTHER PUBLICATIONS

Xu et al., "Query decomposition based on ontology mapping in data integration system", Third International Conference on Natural Computation (ICNC 2007), 2007 IEEE; pp. 1-5.
Yagi et al., "GMM Foreground Segmentation Processor Based on Address Free Pixel Streams", Acoustics, Speech and Signal Processing (ICASSP), 2012 IEEE International Conference on IEEE, 2012, pp. 1653-1656.
Z/Architecture: "Principles of Operation"; Tenth Edition, Sep. 2012; Publication No. SA22-7832-09; copyright IBM Corp.; 1990-2012; p. 1-1568.

\* cited by examiner

TUNABLE HARDWARE SORT ENGINE FOR PERFORMING COMPOSITE SORTING ALGORITHMS

DOMESTIC PRIORITY

This application is a continuation application of the legally related U.S. Ser. No. 13/961,094, filed Aug. 7, 2013, the contents of which are incorporated by reference herein in their entirety.

BACKGROUND

The present invention relates to a hardware implementation of sorting algorithms, and more specifically, to a tunable hardware sort engine for performing composite sorting algorithms.

Sorting is generally acknowledged to be one of the most time-consuming computer-implemented procedures. It has been estimated that over twenty-five percent of all computer running time is devoted to sorting. In fact, many computing systems use over half of their available computer time for sorting. Numerous proposals and improvements have been disclosed in the art for the purposes of reducing sorting time and increasing sorting efficiency.

Specialized hardware devices, generally referred to as accelerators, are commonly used to perform sorting functions. Currently, such devices are configured to efficiently perform a specific sorting function that has specific performance characteristics, such as sort size and throughput. Accordingly, in order for an accelerator to be used to perform sorting functions with different performance characteristics the accelerator must be re-configured. Deciding and defining the parameters necessary for a sort function in an accelerator typically results in re-architecting the actual sort function, which can be costly from time and implementation effort point of view and limits the amount of design reuse.

SUMMARY

According to an embodiment, a method for performing a composite sort on a tunable hardware sort engine includes determining one or more desired sort performance parameters, configuring a composite sort engine of the tunable hardware sort engine based on the one or more desired sort performance parameters, and receiving, by the tunable hardware sort engine, a plurality of keys having a payload associated with each of the plurality of keys. The method also includes reserving a portion of a DRAM storage for each of the payloads, generating a tag for each of the plurality of keys, the tag identifying the portion of the DRAM storage reserved for each of the payloads, and storing the payloads in the portions of the DRAM storage. The method further includes generating a composite key for each of the plurality of keys, sorting the composite keys by the composite sort engine, and retrieving the payloads associated with the sorted composite keys from the DRAM storage. The method also includes outputting the payloads associated the sorted composite keys.

According to another embodiment, a tunable hardware sort engine including a key extractor configured to receive a plurality of keys having a payload associated with each of the plurality of keys, reserve a portion of a DRAM storage for each of the payloads, and generate a tag for each of the plurality of keys, the tag identifying the portion of the DRAM storage reserved for each of the payloads. The key extractor is also configured to store the payloads in the portions of the DRAM storage and generate a composite key for each of the plurality of keys. The tunable hardware sort engine also includes a composite sort engine configured to sort the composite keys, wherein a configuration of the composite sort engine is based one or more desired sort performance parameters of the tunable hardware sort engine. The tunable hardware sort engine is configured to retrieve the payloads associated with the sorted composite keys from the DRAM storage and to output the payloads associated the sorted composite keys.

According to another embodiment, a computer program product including a non-transitory computer readable storage medium having computer readable program code stored thereon that, when executed, performs a method. The method includes determining one or more desired sort performance parameters, configuring a composite sort engine of the tunable hardware sort engine based on the one or more desired sort performance parameters, and receiving, by the tunable hardware sort engine, a plurality of keys having a payload associated with each of the plurality of keys. The method also includes reserving a portion of a DRAM storage for each of the payloads, generating a tag for each of the plurality of keys, the tag identifying the portion of the DRAM storage reserved for each of the payloads, and storing the payloads in the portions of the DRAM storage. The method further includes generating a composite key for each of the plurality of keys, sorting the composite keys by the composite sort engine, and retrieving the payloads associated with the sorted composite keys from the DRAM storage. The method also includes outputting the payloads associated the sorted composite keys.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein include a tunable hardware sort engine having a composite sort engine that can be configured to provide a sort with parameters that can be adjusted for a specific application. In exemplary embodiments, the parameters include, but are not limited to, performance, throughput and capacity. In exemplary embodiments, the composite sort engine is composed of individual components that can be tuned to provide a sort that can be optimized for the number of keys in sorted run, the consumption rate of arriving keys, the rate of producing sorted keys or the chip area available. In exemplary embodiments, the tunable hardware sort engine provides the ability to handle arbitrary payloads that may be associated with the key to be sorted.

Figure 1:
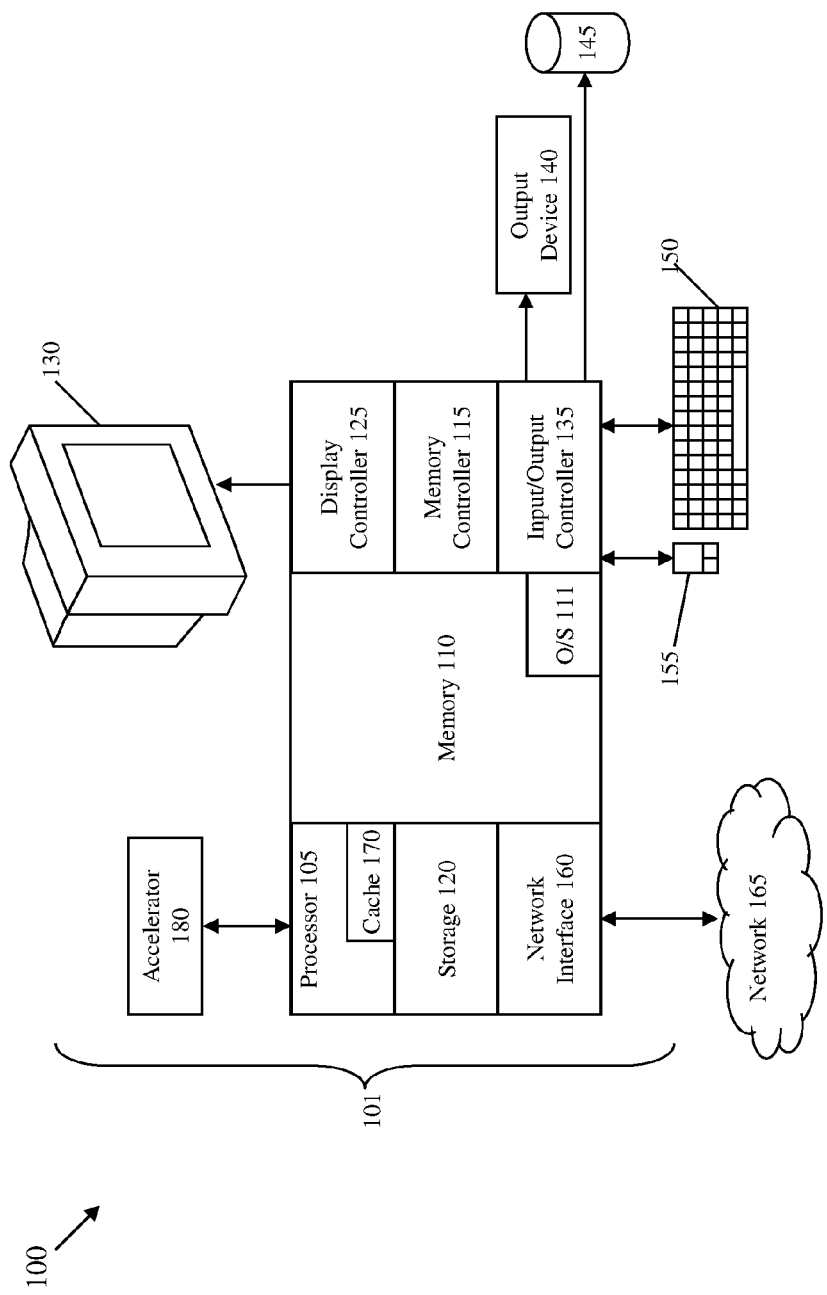
FIG. 1 depicts a block diagram of a computer system for practicing the teachings herein according to an exemplary embodiment.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. In exemplary embodiments, the computer system 100 includes one or more accelerators 180 that are configured to communicate with the processor 105. The accelerator 180 may be a field programmable gate array (FPGA) or other suitable device that is configured to perform specific processing tasks. In exemplary embodiments, the computer system 100 may be configured to offload certain processing tasks to an accelerator 180 because the accelerator 180 can perform the processing tasks more efficiently than the processor 105.

Figure 2:
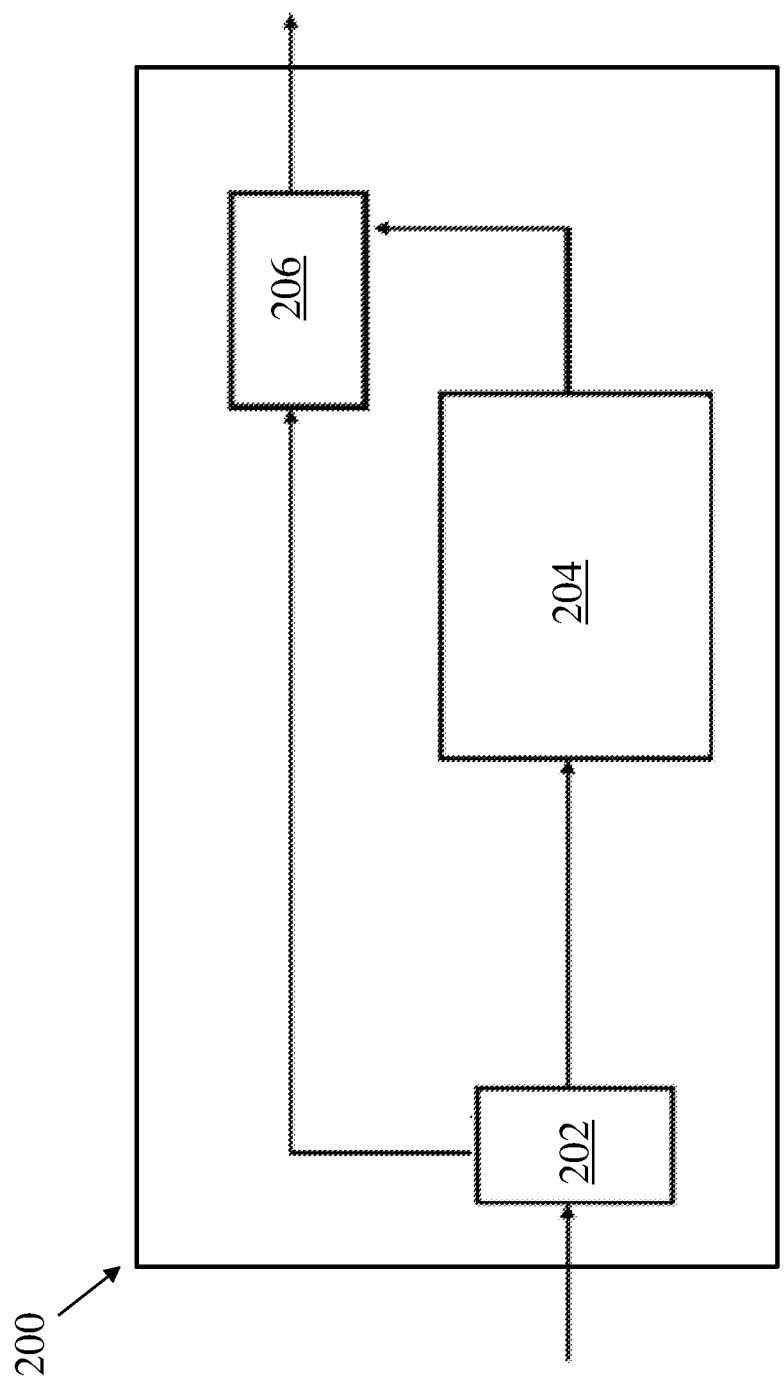
FIG. 2 depicts a block diagram of a tunable hardware sort engine in accordance with an exemplary embodiment.

Referring now to FIG. 2, a block diagram illustrating a tunable hardware sort engine 200 in accordance with an exemplary embodiment is shown. In exemplary embodiments, the tunable hardware sort engine 200 is a hardware accelerator device that is configured to receive a stream of keys from a processor, sort the keys and return the sorted keys to the processor. The tunable hardware sort engine 200 includes a key extractor 202, a composite sort engine 204 and DRAM storage 206. The composite sort engine 204 of the tunable hardware sort engine 200 can be configured to provide a sort with parameters that can be adjusted for a specific application. In exemplary embodiments, the parameters include, but are not limited to, performance, throughput and capacity. In exemplary embodiments, the composite sort engine 204 is composed of individual components that can be tuned to provide a sort that can be optimized for the number of keys in sorted run, the consumption rate of arriving keys, the rate of producing sorted keys or the chip area available.

During operation of the tunable hardware sort engine 200, a plurality of keys arrive at the key extraction unit 202 and each of the keys arrives with an associated payload. In exemplary embodiments, the key is the data that is to be sorted and the payload is data that is associated with the data to be sorted. For example, the key may be a field of a database such as a time or a date and the payload may be other related fields of the database. In exemplary embodiments, the key and the payload diverge at the key extraction unit 202. In one embodiment, the key extraction unit 202 reserves space in the DRAM storage 206 for the payload and generates a tag that is used to reference the location of the stored payload in the DRAM storage 206. In exemplary embodiments, the DRAM storage 206 is broken into units that allow only a few bits to specify a storage location. In one embodiment, the storage location may include both a starting address and a length of the payload.

Figure 3:
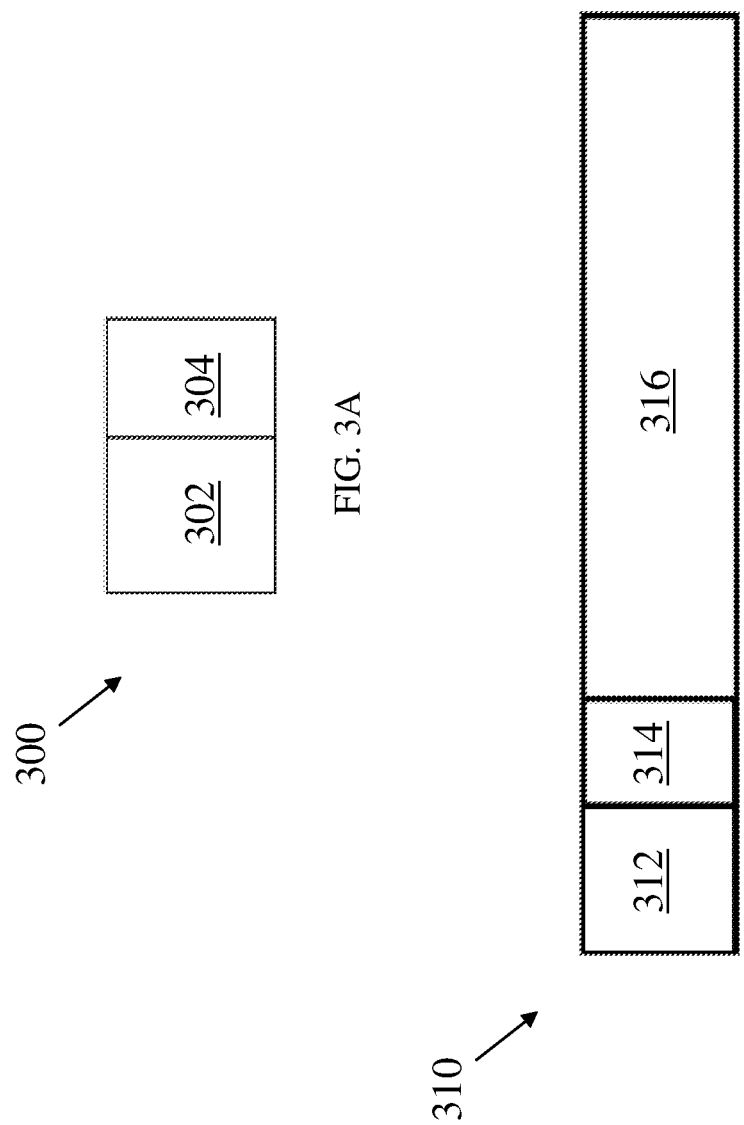
FIG. 3A depicts a block diagram of a tag in accordance with an exemplary embodiment.
FIG. 3B depicts a block diagram of a composite key in accordance with an exemplary embodiment.

Referring now to FIGS. 3A and 3B, block diagrams of a tag 300 and a composite key 310 are respectively shown. In exemplary embodiments, the tag 300 includes a location field 302 and a size field 304. In one example, the location field 302 of the tag 300 indicates a starting address of a payload in the DRAM storage and the size field 304 indicates the length of the payload. In exemplary embodiments, the composite key 310 includes a location field 312, a size field 314 and the key 316. In one example, the location field 312 of the composite key 310 indicates a starting address of a payload in the DRAM storage, the size field 314 indicates the length of the payload and the key 316 includes the key value associated with the payload.

Continuing with reference to FIG. 2, in one embodiment the key extraction unit 202 creates a tag, as shown in FIG. 3A, and sends the tag and payload to the DRAM storage 206. In addition, the key extraction unit 202 creates a composite tag, as shown in FIG. 3B, and sends the composite tag to the composite sort engine 204. The composite sort engine 204 sorts the composite tags and outputs the composite tags in a sorted order. As the sorted composite tags are being output the tunable hardware sort engine 200 retrieves the payload associated the composite tags and outputs the payloads in a sorted order. In exemplary embodiments, the key value may also be output with the payload by the tunable hardware sort engine 200. In exemplary embodiments, the tunable hardware sort engine 200 relieves the processor of the need to perform one or more tasks that include, but are not limited to, splitting keys from their associated payload, sending keys to be sorted, sorting keys and retrieving the payload once keys are sorted.

Figure 4:
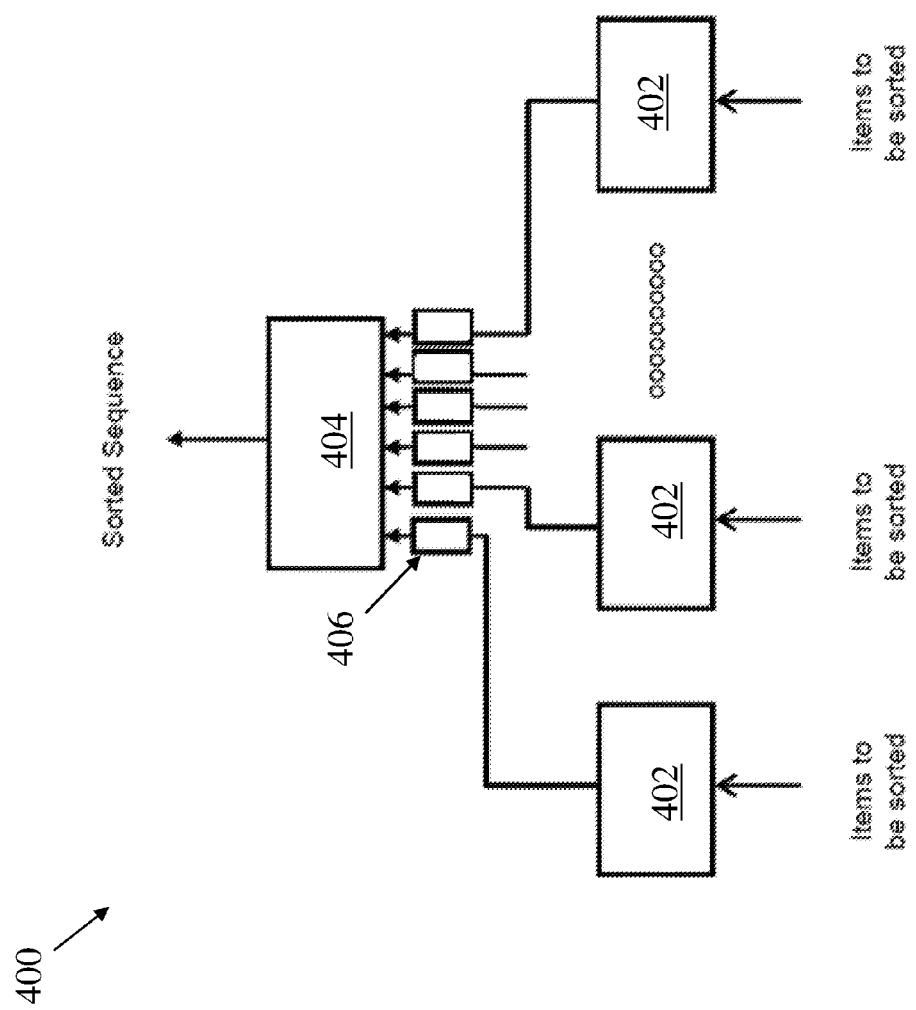
FIG. 4 depicts a block diagram of a composite sort engine in accordance with an exemplary embodiment.

Referring now to FIG. 4, a block diagram of a composite sort engine 400 in accordance with an exemplary embodiment is shown. As illustrated, the composite sort engine 400 includes a plurality of components that include, but are not limited to, sort engines 402, buffers 406, and a merge unit 404. In exemplary embodiments, the number and configuration of these components can be adjusted to provide a composite sort that can be optimized for a variety of sort performance parameters. In exemplary embodiments, the sort performance parameters may include, but are not limited to, the number of keys in a sorted run, the consumption rate of arriving keys, the rate of producing sorted keys, and the available chip area, or the number of available gates on the accelerator.

In exemplary embodiments, each of the sort engines 402 is a parameterizable sort engine that can be used to adjust the latency and capacity of the composite sort engine 400. During operation, the composite sort engine 400 receives a plurality of composite keys and sends each of the composite keys to one of the sort engines 402. In exemplary embodiments, the composite sort engine 400 may determine which of the sort engines 402 to send the composite keys to based on the type and number of sort engines 402 available. The sort engines 402 output sorted composite keys which are then sent to buffers 406. The merge unit 404 receives composite keys from the buffers 406, performs further sorting of the composite keys and outputs a sorted sequence of composite keys.

In exemplary embodiment, the composite keys enter the composite sort engine 400 and are forwarded to one of the sort engines 402. As the sort engines 402 begin to emit sorted composite keys, the sorted composite keys are then merged by the merge unit 404. In exemplary embodiments, the merge unit 404 is configured to perform further sorting of the merged composite keys and to output the sorted composite keys. In one embodiment, the sort algorithm used by the sort engines 402 may be a radix sorting algorithm that is only capable of sorting fixed size batches of keys. In another embodiment, the sort algorithm used by the sort engines 402 may be a tournament tree sorting algorithm that is configured to perform sorting of a continuous streaming of keys. In embodiments having continuous streaming sorting algorithms, it may be necessary to check whether the composite key being inserted into a sorting engine 402 is below/above a value of the last composite key emitted from the sort engine 402 to determine if it can participate in the current sort.

In exemplary embodiments, by tuning the parameters of the sort engines 402 and the merger unit 404 composite sorting engines 400, and therefore tunable hardware sort engines, with different performance parameters can be realized. In one embodiment, a tournament tree sort may be used as the sorting algorithm of the sorting engine 402. The tournament sort needs a minimum number of keys inserted before it can begin sorting and the minimum run size determines the height of the sorting tree and in turn the latency of the sorting algorithm. In another embodiment, a radix sort may be used as the sorting algorithm of the sorting engine 402. In one embodiment, the composite sorting engine includes four sorting engines that each output a composite key every four clock cycles. These composite keys are then input into the merge unit, which is configured to output on average a single composite key every clock cycle.

In exemplary embodiments, for each new key inserted into the tree of a tournament tree sort, the tournament tree algorithm requires only one comparison at each of the log(N) levels of the tree, since the comparisons are made along a known path to the root. This characteristic allows the entire tree to be served with a single comparator, with a throughput of 1 key per log(N) cycles. In exemplary embodiments, a composite sorting engine 400 may include log(N) sorting engines that are each configured to perform tournament tree sort operating in parallel can thus yield an effective throughput of 1 key per cycle. The merge unit 404 may be a log(N)-way merge tree with log(N)−1 comparators can merge these independent sorted streams into a single sorted stream.

As will be appreciated by those of ordinary skill in the art, the composite sorting engine may have a variety of configurations that are selected based on the desired performance parameters of the tunable hardware sort engine that the composite sorting engine is disposed on. The composite sorting engine configurations described above and illustrated are intended as merely illustrative examples and are not intended to be limiting in any way.

Figure 5:
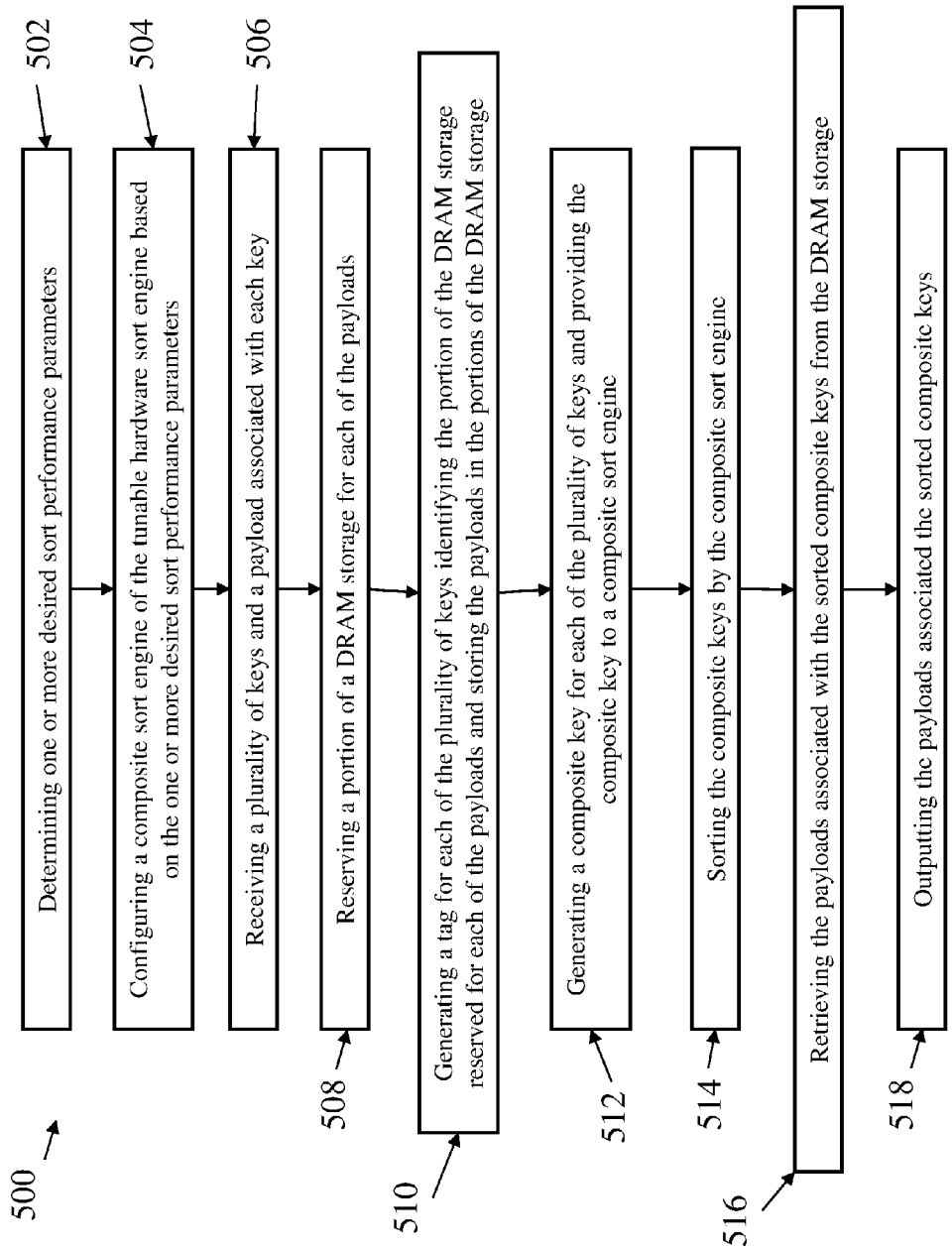
FIG. 5 depicts a flow diagram of a method for performing a composite sort in accordance with an exemplary embodiment.

Referring now to FIG. 5, a flow diagram illustrating a method 500 for performing a composite sort on a tunable hardware sort engine according to an embodiment is shown. As illustrated at block 502, the method 500 includes determining one or more desired sort performance parameters. Next, as shown at block 504, the method 500 includes configuring a composite sort engine of the tunable hardware sort engine based on the one or more desired sort performance parameters. In exemplary embodiments, the desired sort performance parameters may include, but are not limited to, a key throughput rate, the number of keys in each run, a consumption rate of arriving keys, a rate of producing sorted keys or the like. In addition, the composite sort engine of the tunable hardware sort engine may be configured base upon the characteristics of the tunable hardware sort engine.

As shown at block 506, the method 500 receiving a plurality of keys and a payload associated with each key. Next, as shown at block 508, the method 500 includes reserving a portion of a DRAM storage for each of the payloads. The method 500 also includes generating a tag for each of the plurality of keys identifying the portion of the DRAM storage reserved for each of the payloads and storing the payloads in the portions of the DRAM storage, as shown at block 510. Next, as shown at block 512, the method 500 includes generating a composite key for each of the plurality of keys and providing the composite key to a composite sort engine. The method 500 also includes sorting the composite keys by the composite sort engine, as shown at block 514. Next, as shown at block 516, the method 500 includes retrieving the payloads associated with the sorted composite keys from the DRAM storage. The method 500 also includes outputting the payloads associated the sorted composite keys, as shown at block 518.

In exemplary embodiments, the composite key generated for each of the plurality of keys consists of the tag generated for each of the plurality of keys and a value associated with each of the plurality of keys. In exemplary embodiments, the tag consists of a starting address of a location of the DRAM storage and a size of the payload.

In exemplary embodiments, sorting the composite keys by the composite sort engine comprises distributing each of the composite keys to one of a plurality of sorting engines and merging the output of the plurality of sorting engines. In exemplary embodiments, a quantity and a type of the plurality of sorting engines is selected based on one or more sort performance parameters, which include, but are not limited to, a number of keys in a sorted run, a consumption rate of arriving keys, and a rate of producing sorted keys.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A tunable hardware sort engine comprising:
   a key extractor configured to:
      receive a plurality of keys having a payload associated with each of the plurality of keys;
      generate a tag for each of the plurality of keys, the tag identifying a location of a DRAM storage for each of the payloads;
      store the payloads in portions of the DRAM storage; and
      generate a composite key for each of the plurality of keys; and
   a composite sort engine configured to sort the composite keys, wherein a configuration of the composite sort engine is based one or more desired sort performance parameters of the tunable hardware sort engine;
   wherein the tunable hardware sort engine is configured to retrieve the payloads associated with the sorted composite keys from the DRAM storage and to output the payloads associated the sorted composite keys.

2. The tunable hardware sort engine of claim 1, wherein the composite key generated for each of the plurality of keys consists of the tag generated for each of the plurality of keys and a value associated with each of the plurality of keys.

3. The tunable hardware sort engine of claim 1, wherein the composite sort engine comprises a plurality of sorting engines and a merging unit configured to receive the output of the plurality of sorting engines.

4. The tunable hardware sort engine of claim 1, wherein a quantity and a type of the plurality of sorting engines is selected based on one or more sort parameters.

5. The tunable hardware sort engine of claim 4, wherein the one or more sort parameters include at least one of the following: a number of keys in a sorted run; a consumption rate of arriving keys; an available chip area; and a rate of producing sorted keys.

6. The tunable hardware sort engine of claim 5, wherein the type of the sorting engines is a tournament tree sort.

7. The tunable hardware sort engine of claim 1, wherein the tag consists of a starting address of a location of the DRAM storage and a size of the payload.

8. A computer program product, comprising:
   a non-transitory computer readable storage medium having computer readable program code stored thereon that, when executed, performs a method, the method comprising:
   determining one or more desired sort performance parameters;
   configuring a composite sort engine of a tunable hardware sort engine based on the one or more desired sort performance parameters;
   receiving, by the tunable hardware sort engine, a plurality of keys having a payload associated with each of the plurality of keys;
   generating a tag for each of the plurality of keys, the tag identifying a portion of a DRAM storage reserved for each of the payloads;
   storing the payloads in the DRAM storage;
   generating a composite key for each of the plurality of keys;

sorting the composite keys by the composite sort engine;
retrieving the payloads associated with the sorted composite keys from the DRAM storage; and
outputting the payloads associated the sorted composite keys.

9. The computer program product of claim 8, wherein the composite key generated for each of the plurality of keys consists of the tag generated for each of the plurality of keys and a value associated with each of the plurality of keys.

10. The computer program product of claim 8, wherein sorting the composite keys by the composite sort engine comprises distributing each of the composite keys to one a plurality of sorting engines and merging the output of the plurality of sorting engines.

11. The computer program product of claim 10, wherein a quantity and a type of the plurality of sorting engines is selected based on one or more sort parameters.

12. The computer program product of claim 11, wherein the one or more sort parameters include at least one of the following: a number of keys in a sorted run; a consumption rate of arriving keys; an available chip area; and a rate of producing sorted keys.

13. The computer program product of claim 8, wherein the tag consists of a starting address of a location of the DRAM storage and a size of the payload.

* * * * *